US011040574B2

(12) United States Patent
Misani et al.

(10) Patent No.: US 11,040,574 B2
(45) Date of Patent: Jun. 22, 2021

(54) TYRE FOR MOTORCYLE WHEELS

(71) Applicant: PIRELLI TYRE S.P.A., Milan (IT)

(72) Inventors: Pierangelo Misani, Milan (IT); Mario Mariani, Milan (IT); Luca Bruschelli, Milan (IT); Aline Ringis Pin, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 303 days.

(21) Appl. No.: 15/767,998

(22) PCT Filed: Oct. 25, 2016

(86) PCT No.: PCT/IB2016/056405
§ 371 (c)(1),
(2) Date: Apr. 12, 2018

(87) PCT Pub. No.: WO2017/077418
PCT Pub. Date: May 11, 2017

(65) Prior Publication Data
US 2018/0304694 A1    Oct. 25, 2018

(30) Foreign Application Priority Data
Nov. 4, 2015    (IT) .................. 102015000068871

(51) Int. Cl.
*B60C 11/03*    (2006.01)
(52) U.S. Cl.
CPC ........ *B60C 11/033* (2013.01); *B60C 11/0302* (2013.01); *B60C 11/032* (2013.01);
(Continued)

(58) Field of Classification Search
CPC . B60C 11/033; B60C 11/032; B60C 11/0302; B60C 2200/12; B60C 2200/10; B60C 2011/0372
See application file for complete search history.

(56) References Cited

U.S. PATENT DOCUMENTS 6,776,204 B2 *  8/2004  Cesarini ................. B60C 23/04
                                                                152/209.8
10,919,343 B2   2/2021  Bruschelli et al.
(Continued)

FOREIGN PATENT DOCUMENTS

CN    204526666 U    8/2015
JP    S63121505 A    5/1988
(Continued)

OTHER PUBLICATIONS

International Search Report and Written Opinion for International Application No. PCT/IB2016/055822 filed Sep. 29, 2016 on behalf of Pirelli Tyre S.P.A. dated Jan. 13, 2017. 10 pages.
(Continued)

*Primary Examiner* — Timothy Kennedy
*Assistant Examiner* — Olukorede Esan
(74) *Attorney, Agent, or Firm* — Steinfl + Bruno LLP (57) ABSTRACT

A tyre that can be fitted to the front of a motorcycle. The tyre has a high void-to-rubber ratio and includes grooves located asymmetrically across the equatorial plane of the tyre, arranged substantially orthogonally to the equatorial plane of the tyre at the equatorial plane itself. According to one aspect, the grooves are close to one another in the circumferential direction of the tyre to increase their number in a footprint area of the tyre.

23 Claims, 3 Drawing Sheets

(52) U.S. Cl.
CPC ... *B60C 2011/0372* (2013.01); *B60C 2200/10* (2013.01); *B60C 2200/12* (2013.01)

(56) References Cited

U.S. PATENT DOCUMENTS

| | | | |
|---|---|---|---|
| 2006/0219342 A1 | 10/2006 | Steinbach | |
| 2008/0196806 A1* | 8/2008 | Matrascia | B60C 11/0302 152/209.16 |
| 2010/0282390 A1 | 11/2010 | Mariani et al. | |
| 2011/0247738 A1* | 10/2011 | Mariani | B60C 11/0083 152/209.8 |
| 2012/0060988 A1* | 3/2012 | Otani | B60C 11/0332 152/209.8 |
| 2012/0118456 A1* | 5/2012 | Schiavolin | B60C 11/033 152/209.8 |
| 2014/0182757 A1 | 7/2014 | Mariani et al. | |
| 2014/0230978 A1* | 8/2014 | Misani | B60C 11/0302 152/209.8 |
| 2018/0264886 A1 | 9/2018 | Bruschelli et al. | |
| 2018/0272807 A1 | 9/2018 | Misani et al. | |

FOREIGN PATENT DOCUMENTS

| | | | | |
|---|---|---|---|---|
| JP | H04321404 | A | | 11/1992 |
| JP | 2004224249 | A | | 8/2004 |
| JP | 2011189805 | A | | 9/2011 |
| WO | 2010/041283 | A1 | | 4/2010 |
| WO | 2010/073279 | A1 | | 7/2010 |
| WO | 2011/012980 | A1 | | 2/2011 |
| WO | 2011/041859 | A1 | | 4/2011 |
| WO | 2011/080566 | A1 | | 7/2011 |
| WO | WO 2011080566 | A | * | 7/2011 ......... B60C 11/0302 |
| WO | 2013/021271 | A1 | | 2/2013 |
| WO | 2015/097582 | A1 | | 7/2015 |
| WO | 2017/064585 | A1 | | 4/2017 |
| WO | 2017/077419 | A1 | | 5/2017 |

OTHER PUBLICATIONS

International Search Report and Written Opinion for International Application No. PCT/IB2016/056407 filed Oct. 25, 2016 on behalf of Pirelli Tyre S.P.A. dated Feb. 3, 2017. 10 pages.
International Search Report and Written Opinion for International Application No. PCT/IB2016/056405 filed Oct. 25, 2016 on behalf of Pirelli Tyre S.P.A. dated Feb. 3, 2017. 10 pages.
Non-Final Office Action for U.S. Appl. No. 15/764,856, filed Mar. 29, 2018 on behalf of Pirelli Tyre S.P.A. dated Apr. 9, 2020. 11 Pages.
Non-Final Office Action for U.S. Appl. No. 15/767,617, filed Apr. 11, 2018 on behalf of Pirelli Tyre S.P.A. dated Jun. 12, 2020 16 pages.
Final Office Action for U.S. Appl. No. 15/767,617, filed Apr. 11, 2018 on behalf of Pirelli Tyre S.P.A. dated Jan. 15, 2021. 16 Pages.
Notice of Allowance for U.S. Appl. No. 15/764,856, filed Mar. 29, 2018, on behalf of Pirelli Tyre S.P.A. dated Nov. 18, 2020. 16 Pages.
Supplemental Notice of Allowability for U.S. Appl. No. 15/764,856, filed Mar. 29, 2018, on behalf of Pirelli Tyre S.P.A. dated Jan. 13, 2020. 4 Pages.

* cited by examiner

TYRE FOR MOTORCYLE WHEELS

CROSS REFERENCE TO RELATED APPLICATIONS

The present application is the U.S. National Stage of International Patent Application No. PCT/IB2016/056405 filed on Oct. 25, 2016 which, in turn, claims priority to Italian Application No. 102015000068871 filed on Nov. 4, 2015.

FIELD OF THE INVENTION

The present invention relates to tyres for motorcycle wheels.

In particular, the present invention relates to tyres intended to be fitted to the front wheel of motorcycles of the "Sport Touring" type, i.e. sport motorcycles intended to provide high performance in terms of power, comfort and mileage, designed for use on different kinds of routes and in different road surface conditions.

Typically, the "Sport Touring" motorcycles are motorcycles having large engine capacity (e.g. 800 cm3 or larger), and/or high power (e.g. 100-120 hp or higher).

PRIOR ART

Tyres for motorcycles of the "Sport Touring" type are described for example in the following patent applications to the Applicant WO2010073279, WO2011080566, WO2011012980.

SUMMARY OF THE INVENTION

Tyres for motorcycles of the "Sport Touring" type are required to provide high versatility of use. In particular, they are required to provide grip and traction ability on the road surface for allowing an optimal power transfer, as well as a suitable braking action, even with a load of two persons and on any kind of road surface, such as for example wet, dry, regular and/or irregular asphalt, and/or of routes, such as for example urban roads, motorways, mountain roads with many bends.

Such tyres are also required to provide comfort, stability, controllability, steerability, high mileage and wear evenness.

The Applicant has observed that to date, because of the large number of often mutually contrasting features required from these tyres, the manufacturers have focused their efforts in order to provide "Sport Touring" tyres which are optimized in terms of stability, handling, grip on dry ground, draining, mileage, and wear evenness, sometimes to the detriment of an optimal braking grip in low or very low friction conditions, particularly on wet ground.

In particular, the Applicant is of the opinion that a sudden and/or unexpected reduction of grip on the road surface may endanger the ability to control the vehicle.

The Applicant has thus felt the need to provide a Sport Touring tyre which has excellent features in terms of stability, handling, draining, grip on dry ground, and nevertheless allows improving the grip on road surfaces characterized by low friction, such as for example concrete, worn asphalt or cobblestone pavement, particularly in wet conditions. The Applicant has found that such a need can be met by a tyre, particularly a tyre intended to be fitted to the front wheel of a motorcycle, having a high void-to-rubber ratio and comprising grooves which are located substantially asymmetrically across the equatorial plane and are arranged substantially orthogonally to the equatorial plane at the equatorial plane itself, and especially close to one another in the circumferential direction, so as to increase the number thereof in the footprint area, particularly when running on straight paths or at small lean angles.

In a first aspect thereof, the invention relates to a motorcycle tyre, comprising an equatorial plane and a tread band, wherein:

the tread band comprises a plurality of grooves defining a tread pattern comprising a module repeated along a direction of circumferential development of the tyre, comprising at least two first grooves oppositely inclined relative to the equatorial plane of the tyre;

the grooves of the tread band overall define a void-to-rubber ratio greater than or equal to 9%, preferably greater than or equal to 11% on said tread band;

the first grooves have a length, measured along their extension, equal to or greater than 30% of the width of the tread band;

the first grooves are arranged so that their inclination angle relative to the equatorial plane decreases at least partially in a monotonic way moving away from the equatorial plane;

the first grooves comprise at least one first segment located across the equatorial plane, having inclination angles relative to the equatorial plane comprised in the range between 50° and 90°, and at least one second segment consecutively located relative to the first segment;

the distance between two circumferentially consecutive first grooves at the equatorial plane is equal to or smaller than 2% of the circumferential development of the tread band.

By the term "module" referred to a tread band, particularly to the tread pattern, it is meant a portion of the tread pattern which is repeated the same in succession along the whole circumferential development of the tread band itself. The modules, while keeping the same pattern configuration, may, however, have different circumferential lengths.

By "tread pattern" it is meant the representation of each point of the tread band (grooves included) on a plane perpendicular to the equatorial plane of the tyre and tangent to the maximum diameter of the tyre.

Angular measurements, and/or linear quantities (distances, widths, lengths, etc.), and/or areas are to be intended as referred to the tread pattern as defined above.

Referring to the angular arrangement of the grooves and/or recesses formed in the tread band relative to the equatorial plane of the tyre, such an angular arrangement is to be intended, for each point of the groove and/or recess, as referred to the angle comprised between 0° and 90° (in absolute value) defined by a direction tangent to the groove and/or recess passing through that point relative to the equatorial plane.

By "motorcycle tyre" it is meant a tyre having a high curvature ratio (typically greater than 0.20), which allows high camber angles to be reached when the motorcycle runs on a bend.

By "equatorial plane" of the tyre it is meant a plane perpendicular to the rotation axis of the tyre and dividing the tyre into two equal portions.

By "circumferential" direction it is meant a direction generically directed according to the rotation direction of the tyre, or in any case only slightly inclined relative to the rotation direction of the tyre.

By "void-to-rubber ratio" it is meant the ratio between the total area of the grooves of a determined portion of the tread pattern of the tyre (possibly of the whole tread pattern) and the total area of the same portion of the tread pattern (possibly of the whole tread pattern).

By "curvature ratio" of the tyre it is meant the ratio between the distance of the radially highest point of the tread band from the maximum cross section width (also called maximum chord) of the tyre, and the same maximum width of the tyre, in a cross section of the tyre.

By "maximum cross section width" (or maximum chord) it is meant the maximum width of the tyre profile, in other words the length of the segment whose ends are the axially outermost points of the tread profile.

The present invention, in one or more preferred aspects thereof, my comprise one or more of the features hereinafter presented.

Preferably, the first segment may be located within an annular portion of the tread band identified by the ends of said first grooves which are closer to the equatorial plane. Such an annular portion of the tread band has a width equal to or smaller than 30% of the width of the tread band.

Advantageously, the first segment may have a length, measured along its extension, equal to or smaller than 35% of the width of the tread band.

Conveniently, the first segment may be arranged substantially according to an at least partially curved line.

Such an at least partially curved line may define a convexity. The convexity may be oriented oppositely to a rolling direction of the tyre.

Preferably, said first two grooves oppositely inclined relative to the equatorial plane of the tyre may be circumferentially staggered.

Preferably, the second segment of the first grooves is located outside said annular portion of the tread band. Even more preferably, the second segment of the first grooves is located laterally on only one side of said tread band relative to said annular portion.

Advantageously, at the equatorial plane the distance in a circumferential direction between two circumferentially consecutive first grooves may be comprised in the range between 0.4% and 2% of the circumferential development of the tread band.

Conveniently, the first grooves do not have mutual intersection points.

Preferably, the distance in a circumferential direction between two circumferentially consecutive first grooves may be substantially constant at an axial distance from the equatorial plane equal to or smaller than 20% of the width of the tread band.

Advantageously, the module may comprise at least two second grooves oppositely inclined relative to the equatorial plane.

Conveniently, the second grooves may have inclination angles relative to the equatorial plane which increase moving away from the equatorial plane.

Preferably, the second grooves may have inclination angles relative to the equatorial plane which are smaller than 90°, preferably greater than 20°.

Advantageously, each second groove may have a length, measured along its extension, equal to or smaller than 30% of the width of the tread band.

Preferably, the second grooves may be substantially aligned to the continuation of the first grooves which points towards the tyre shoulder.

Conveniently, each first groove may have a depth equal to or smaller than 7 mm, preferably equal to or smaller than 6 mm.

Advantageously, each first groove may have a width which increases moving away from the equatorial plane on at least one side of said tread band.

Preferably, at least a portion of the second segment of said first grooves has an inclination angle relative to the equatorial plane which increases moving away from the equatorial plane.

BRIEF DESCRIPTION OF THE DRAWINGS

Further features and advantages of the invention shall become clearer from the detailed description of some preferred, although not exclusive, embodiments of a motorcycle tyre according to the present invention.

Such description shall be made hereafter with reference to the accompanying drawings, provided only for indicating, and thus non-limiting, purposes, wherein.

DETAILED DESCRIPTION OF EMBODIMENTS OF THE INVENTION

Figure 1:
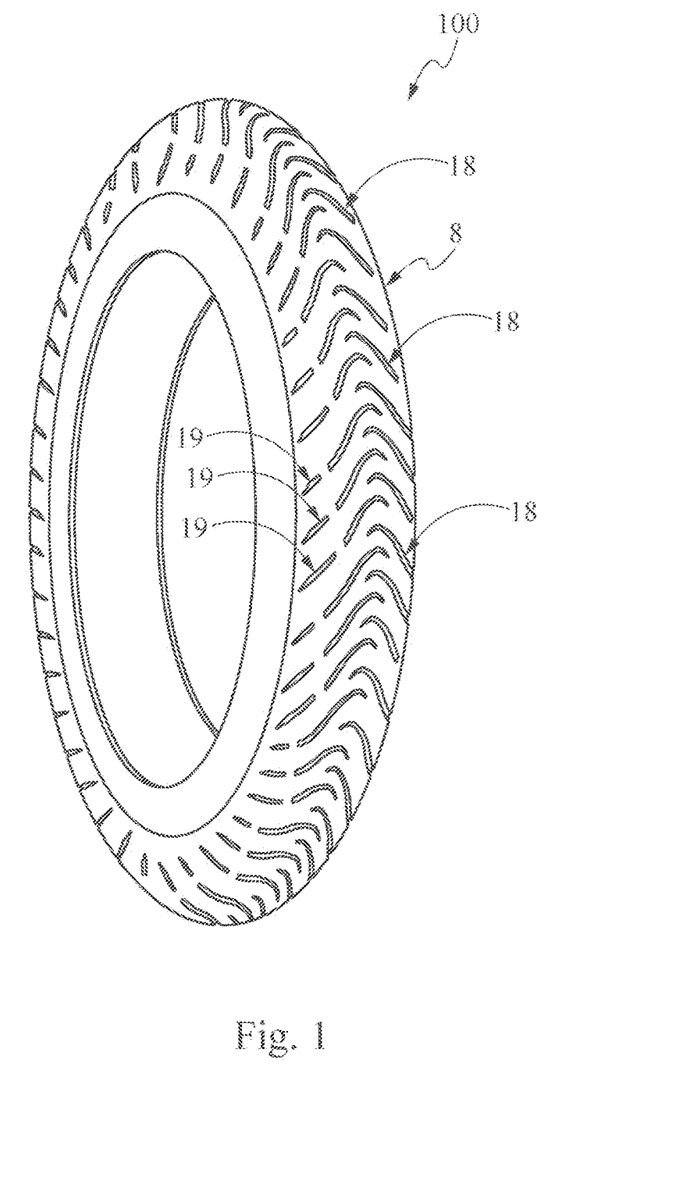
FIG. 1 shows a perspective view of a first example of a tyre according to the invention.
Figure 2:
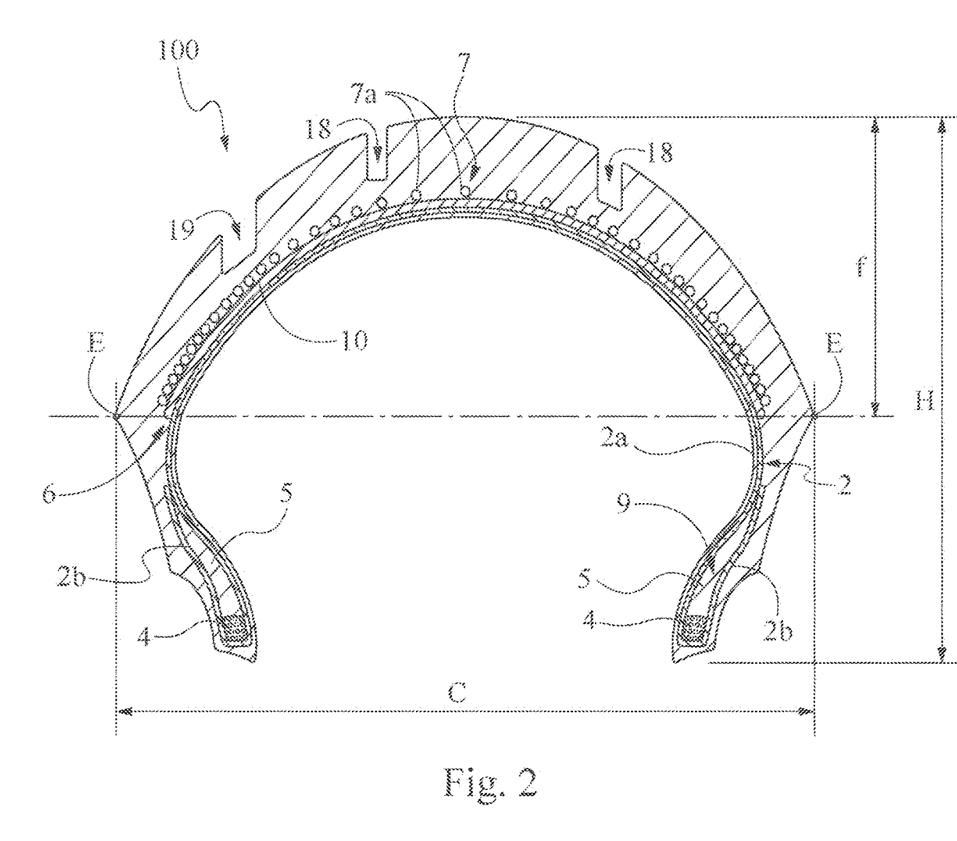
FIG. 2 is a radial section view of the tyre of FIG. 1.
Figure 3:
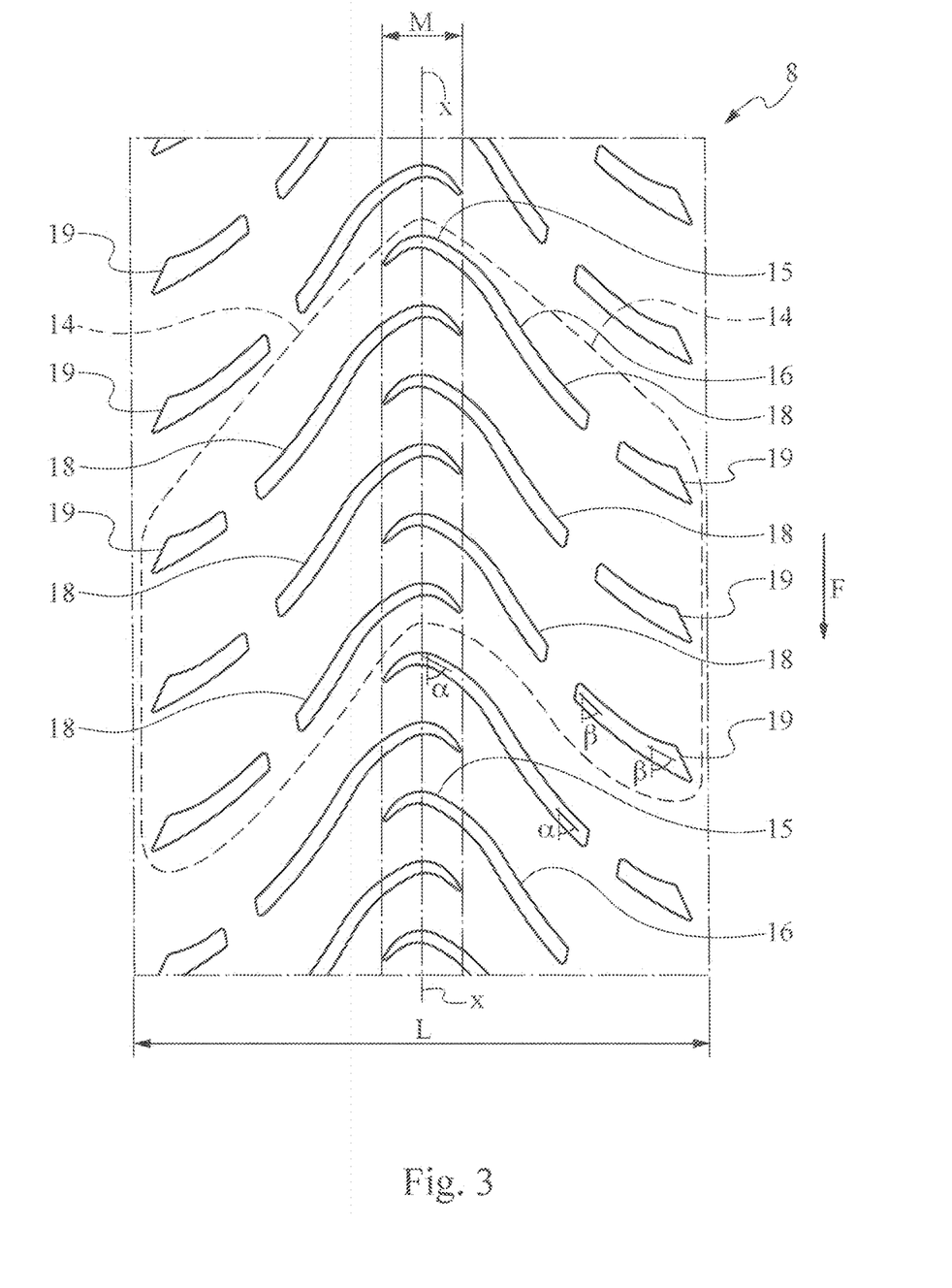
FIG. 3 is a schematic plan view of a portion of the tread band of the tyre of FIG. 1.

In FIGS. 1-3 a tyre for motorcycle wheels according to the present invention is generally indicated at 100. The tyre is preferably intended to be used on a front motorcycle wheel, in a motorcycle having large engine capacity, e.g. 600-800 cc and larger.

An equatorial plane X-X and a rotation axis (not shown), orthogonal to the equatorial plane, are defined in the tyre 100. Moreover, there are defined a circumferential direction (indicated in the figures by an arrow F pointing in the rotation direction of the tyre) and an axial direction perpendicular to the equatorial plane X-X.

The tyre 100 comprises a carcass structure 2 including at least one carcass layer 2a, made of an elastomeric material and comprising a plurality of reinforcing elements arranged parallel to one another.

The at least one carcass layer engages, by means of opposite circumferential edges thereof, also superimposed, at least one annular reinforcing structure 9.

In particular, the opposite lateral edges of the at least one carcass layer 2a are turned up about annular reinforcing structures, called bead rings 4.

A tapered elastomeric filling 5 taking up the space defined between the carcass layer 2a and the respective turned-up lateral edge 2b of the carcass layer 2a is applied onto the axially outer perimeter edge of the bead rings 4.

The tyre region comprising the bead ring 4 and the filling 5 forms the so-called bead, intended for anchoring the tyre to a respective fitting rim, not shown.

Still referring to the embodiment shown in FIG. 2, the reinforcing elements included in the carcass layer 2a preferably comprise textile cords, selected from those usually adopted in the manufacture of carcasses for tyres, for example Nylon, Rayon, PET, PEN, Lyocell cords, with an elementary filament having a diameter of between 0.35 mm and 1.5 mm, or steel metal cords with an elementary filament having a diameter of between 0.10 mm and 0.5 mm.

In an embodiment not shown, the carcass structure has its opposite lateral edges associated without a turn-up with special annular reinforcing structures provided with two annular inserts. A filling of elastomeric material may be located in an axially outer position relative to the first annular insert. The second annular insert is instead located in an axially outer position relative to the end of the carcass layer. Finally, in an axially outer position relative to said second annular insert, and not necessarily in contact with the same, a further filling may be provided which terminates the formation of the annular reinforcing structure.

A tread band 8 is circumferentially applied, in a radially outer position, on the carcass structure 2. Longitudinal and/or transverse grooves, arranged so as to define a desired tread pattern, are typically formed on the tread band 8 further to a molding operation carried out at the same time with the vulcanization of the tyre.

The tyre 100 may comprise a pair of sidewalls laterally applied on opposite sides to said carcass structure 2.

The tyre 100 has a cross section characterized by a high transverse curvature.

In particular, the tyre 100 has a section height H measured, at the equatorial plane, between the top of the tread band and the fitting diameter, identified by the line passing through the tyre beads.

The tyre 100 further has a maximum cross section width C defined by the distance between the laterally opposite ends E of the tread profile, and a curvature defined by the specific value of the ratio between the distance f of the top of the tread from the line passing through the ends E of the tread itself, measured at the equatorial plane of the tyre, and the aforesaid maximum width C. The ends E of the tread may be formed by a corner.

In the present description and in the subsequent claims, by high curvature tyres, tyres are meant which have a curvature ratio f/C not smaller than 0.20, preferably f/C≥0.25, for example 0.28. Preferably, such curvature ratio f/C is not greater than 0.6, preferably f/C≤0.45.

Preferably, the tyres have particularly low sidewalls (FIG. 2), the sidewall height ratio (H-f)/H being smaller than 0.6, more preferably smaller than 0.5, for example smaller than or equal to about 0.45. The carcass structure 2 is typically lined on its inner walls with a sealing layer, or so-called "liner", essentially consisting of a layer of an airtight elastomeric material, adapted to ensure the tight seal of the tyre itself after it has been inflated.

Preferably, the belt structure 6 comprises a layer 7 having a plurality of circumferential windings 7a axially arranged in side-by-side relationship, formed by a rubberized cord or by a strip comprising a number (preferably, from two to five) of rubberized cords, spirally wound at an angle substantially equal to zero (typically between 0° and 5°) relative to the equatorial plane X-X of the tyre. Preferably, the belt structure extends substantially over the whole crown portion of the tyre. In a further embodiment, the belt structure 6 may comprise at least two radially superimposed layers, each consisting of elastomeric material reinforced with cords arranged parallel to one another. The layers are arranged so that the cords of the first belt layer are oriented obliquely relative to the equatorial plane of the tyre, whereas the cords of the second layer also have an oblique orientation, but symmetrically crossed relative to the cords of the first layer (so-called "cross-belt").

In both cases, generally, the cords of the belt structure are textile or metallic cords. Preferably, the tyre 100 may comprise a layer 10 of elastomeric material, located between said carcass structure 2 and said belt structure 6 formed by said circumferential coils, said layer 10 preferably extending over an area substantially corresponding to the area on which the belt structure 6 develops. Alternatively, said layer 10 extends over an area which is smaller than the area on which the belt structure 6 develops, for example only over opposite lateral portions thereof.

In a further embodiment, an additional layer (not shown in FIG. 2) of elastomeric material is located between said belt structure 6 and said tread band 8, said layer preferably extending over an area substantially corresponding to the area on which said belt structure 6 develops. Alternatively, said layer extends only over at least a portion of the development of the belt structure 6, for example over opposite lateral portions thereof.

In an embodiment, at least one of said layer 10 and said additional layer comprises a reinforcing material, for example aromatic polyamide fibers, dispersed in said elastomeric material.

As better shown in FIG. 3, on the tread band 8 a tread pattern is formed comprising a plurality of grooves, which overall define on the tread band a void-to-rubber ratio greater than 9%, for example equal to about 12%.

Preferably, for providing the tread band with a suitable stiffness without limiting its draining ability, the grooves overall define on the tread band a void-to-rubber ratio smaller than 17%, preferably smaller 15%.

According to an advantageous aspect of the present invention, the tread band comprises a module 14 repeated along a direction of circumferential development of the tyre. The module 14 is repeated at least fourteen times, preferably at least fifteen times, for example seventeen times, along the circumferential development of the tyre.

A high number of repetitions of the module along the direction of circumferential development of the tyre results into the presence of a larger number of grooves in the footprint area, to the advantage of the braking ability of the tyre.

Referring to the embodiment shown in FIGS. 1 and 3, the module 14 has at least two first grooves 18 oppositely inclined relative to the equatorial plane X-X and at least two second grooves 19, also oppositely inclined relative to the equatorial plane X-X. The first grooves 18 are arranged asymmetrically across the equatorial plane X-X.

Preferably, the first two grooves 18 oppositely inclined relative to the equatorial plane X-X are circumferentially staggered, whereas the second grooves 19 are substantially aligned to the continuation of the first grooves 18 which points towards the tyre shoulder 5.

Referring to the embodiment shown in FIG. 3, the module 14 has three pairs of first grooves 18 oppositely inclined relative to the equatorial plane X-X and at least three pairs of second grooves 19 also oppositely inclined relative to the equatorial plane X-X. The three pairs of first and second grooves 18, 19 respectively differ from each other because of the different length of the first and second grooves 18, 19.

The first grooves 18 have a considerable dimension. In particular, each first groove 18 has a length, measured along its extension, equal to or greater than 30% of the width L of the tread band 8.

Each first groove could extend up to the shoulder of the tyre.

According to this embodiment, the second grooves 19 could be not present.

In the module of the tread pattern the first grooves 18 are oppositely located relative to the equatorial plane X-X and extend axially away from the equatorial plane X-X so that their inclination angle α relative to the equatorial plane X-X decreases at least partially in a monotonic way. In other words, over at least a portion of the first grooves 18 the inclination angle α relative to the equatorial plane X-X gradually decreases moving away from the equatorial plane itself.

In particular, the inclination angle α is about 90° close to the equatorial plane X-X, and decreases moving away from the equatorial plane X-X up to a value of between about 20° and about 50° at another end located towards the tyre shoulder.

The considerable extension of the first grooves 18 combined with their arrangement provides a suitable draining of the tyre.

Referring to the embodiment shown in FIGS. 1, 3, each first groove 18 extends substantially continuously along an at least partially curved line.

In detail, the first grooves 18 comprise at least one first segment 15 located across the equatorial plane X-X, having inclination angles α relative to the equatorial plane X-X of between about 50° and about 90°, and at least one second segment 16 consecutively located relative to the first segment 15 when moving away from the equatorial plane X-X.

Referring to the embodiment shown in FIG. 3, the first segment 15 is located within an annular portion M of the tread band identified by the ends of the first grooves 18 which are closer to the equatorial plane X-X, and having a width equal to or smaller than 30% of the width L of the tread band 8. The first segment 15 extends across the equatorial plane X-X and is substantially arranged according to an at least partially curved line so as to form a convexity. In the embodiment shown in the figures such a convexity is oriented oppositely to the rolling direction of the tyre, indicated by arrow F in FIG. 3.

For ensuring a symmetrical behavior while rolling, two circumferentially consecutive first grooves 18 have their ends closer to the equatorial plane X-X which are axially staggered in mutually opposite directions relative to the same equatorial plane X-X.

Preferably, each first segment 15 has a length, measured along its extension, equal to or smaller than 35% of the width L of the tread band 8.

The second segment 16 of the first grooves 18 is located outside the annular portion M of the tread band defined by the ends of the first grooves 18 which are closer to the equatorial plane X-X. More particularly, the second segment 16 extends laterally of the annular portion M on only one side of the tread band.

The second segment 16 has a length greater than the length of the first segment 15. Preferably, the second segment has a length equal to or greater than 20% of the length of the first segment 15.

The second segment 16 has inclination angles α relative to the equatorial plane X-X of between about 20° and about 60°. In the embodiment shown in FIG. 3, the inclination angle α increases while moving away from the equatorial plane X-X along at least part of the extension of the second segment 16 up to a value of about 50° at the end of the first groove 18 located towards the shoulder.

The second segment 16 extends along a substantially straight or slightly curved line. At least a portion of the second segment 16 has a convexity oriented as the rolling direction of the tyre, indicated by arrow F in FIG. 3.

The distance between two circumferentially consecutive first grooves 18 at the equatorial plane is equal to or smaller than 2% of the circumferential development of the tread band 8.

Preferably, the distance in a circumferential direction between two circumferentially consecutive first grooves 18 at the equatorial plane X-X is comprised in the range between 0.4% and 2% of the circumferential development of the tread band 8.

Preferably, the distance in a circumferential direction between two circumferentially consecutive first grooves 18 is comprised in the range between 0.4% and 2% of the circumferential development of the tread band 8 on the whole central annular portion M. Still referring to the embodiment shown in FIGS. 1 and 3, the distance in a circumferential direction between two circumferentially consecutive first grooves 18 is substantially constant at an axial distance from the equatorial plane X-X equal to or smaller than 20% of the width L of the tread band 8.

Preferably, the first grooves 18 have a decreasing depth, which gets smaller moving from the equatorial plane X-X towards the shoulders. Preferably, the first grooves 18 have a depth smaller than or equal to 7 mm, more preferably equal to or smaller than 6 mm. The depth of the first grooves 18 gradually decreases moving towards the shoulders of the tyre, in order to increase the compactness of the tread band 8 and the lateral thrust when running on a bend at the maximum lean angle on dry ground.

According to the embodiment shown in FIGS. 1 and 3, for providing on the other hand a good draining of water at high lean angles, the first grooves 18 have a width which substantially increases moving from the equatorial plane X-X towards the shoulders in the portion thereof having a greater extension (i.e. towards the second segment 16). On the contrary, the first grooves have a width which substantially decreases moving from the equatorial plane X-X towards the shoulder in the portion thereof having a smaller extension.

Preferably, the first grooves 18 have a width greater than or equal to 0.5 mm.

Preferably, the first grooves 18 have a width smaller than or equal to 9 mm.

Referring to the embodiment shown in FIGS. 1 and 3, the second grooves 19 are located more outwardly than the first grooves 18 relative to the equatorial plane X-X and do not have intersection points with them. In particular, referring to the embodiment shown in FIGS. 1 and 3, the second grooves 19 are substantially aligned to the continuations of the first grooves 18 which point towards the tyre shoulder.

For each first groove 18, there is a second groove 19 which substantially lies at least partially on its continuation pointing towards the shoulder.

The second grooves 19 do not have mutual intersection points and have a more limited dimension than that of the first grooves 18. In particular, each second groove 19 has a length, measured along its extension, equal to or smaller than 30% of the width L of the tread band 8, preferably equal to or smaller than 20% of the width L of the tread band 8.

The second grooves 19 are opposed to each other relative to the equatorial plane X-X and extend away from the equatorial plane X-X so that their inclination angle β relative to the equatorial plane X-X increases moving away from the equatorial plane X-X.

Still referring to the embodiment shown in FIG. 3, the inclination angle β varies between about 20° and about 90°, preferably between 35° and 60°.

Preferably, the second grooves 19 have a decreasing depth, which gets smaller moving from the equatorial plane X-X towards the shoulders. Preferably, the second grooves 19 have a depth smaller than or equal to 6 mm, more preferably equal to or smaller than 5 mm.

According to the embodiment shown in FIGS. 1 and 3, still for providing a good draining of water at high lean angles, the second grooves 19 have a width which substantially increases from the equatorial plane X-X towards the shoulders. Preferably, the second grooves 19 have a width greater than or equal to 0.5 mm.

Preferably, the second grooves 19 have a width smaller than or equal to 9 mm, preferably, smaller than 8 mm.

The present invention has been described with reference to some embodiments thereof. Many modifications can be made in the embodiments described in detail, still remaining within the scope of protection of the invention, defined by the following claims.

The invention claimed is:

1. A motorcycle tyre, comprising:
an equatorial plane; and
a tread band comprising a plurality of grooves that define a tread pattern, the tread pattern comprising a module repeated along a direction of circumferential development of the tyre, the module comprising at least two first grooves oppositely inclined relative to the equatorial plane;
wherein:
the plurality of grooves of the tread band overall provide a void-to-rubber ratio greater than or equal to 9%;
said at least two first grooves have a length, measured along their extension, equal to or greater than 30% of the width of the tread band;
said at least two first grooves have a first inclination angle relative to the equatorial plane that decreases, at least partially, monotonically, for said at least two first grooves moving away from the equatorial plane;
said at least two first grooves comprise a first segment located across the equatorial plane, the first segment having first segment inclination angles, relative to the equatorial plane, in a range between 50° and 90°,
said at least two first grooves comprise a second segment consecutively located relative to the first segment, and
distance between two circumferentially consecutive first grooves at the equatorial plane is equal to or smaller than 2% of the circumferential development.

2. The motorcycle tyre according to claim 1, wherein:
the first segment is located within an annular portion of the tread band identified by ends of said first grooves that are closer to the equatorial plane, and
wherein the annular portion has a width equal to or smaller than 30% of the width of the tread band.

3. The motorcycle tyre according to claim 1, wherein the first segment has a length, measured along its extension, equal to or smaller than 35% of the width of the tread band.

4. The motorcycle tyre according to claim 1, wherein the first segment is substantially a partially curved line.

5. The motorcycle tyre according to claim 4, wherein the partially curved line defines a convexity oriented oppositely to a rolling direction of the tyre.

6. The motorcycle tyre according to claim 1, wherein the at least two first grooves are circumferentially staggered.

7. The motorcycle tyre according to claim 2, wherein the second segment is located outside the annular portion.

8. The motorcycle tyre according to claim 7, wherein the second segment is located laterally on only one side of the tread band relative to the annular portion.

9. The motorcycle tyre according to claim 1, wherein, at the equatorial plane, the distance in a circumferential direction between two circumferentially consecutive first grooves is in a range between 0.4% and 2% of the circumferential development.

10. The motorcycle tyre according to claim 1, wherein the at least two first grooves do not mutually intersect.

11. The motorcycle tyre according to claim 1, wherein a distance, in a circumferential direction, between two circumferentially consecutive first grooves, is substantially constant at an axial distance from the equatorial plane equal to or smaller than 20of the width of the tread band.

12. The motorcycle tyre according to claim 1, wherein the module further comprises at least two second grooves opposed to each other relative to the equatorial plane.

13. The motorcycle tyre according to claim 12, wherein the at least two second grooves have second inclination angles relative to the equatorial plane that increase for said second grooves moving away from the equatorial plane.

14. The motorcycle tyre according to claim 12, wherein the at least two second grooves have second inclination angles relative to the equatorial plane that are smaller than 90°.

15. The motorcycle tyre according to claim 13, wherein the second inclination angles are smaller than 90°.

16. The motorcycle tyre according to claim 12, wherein each second groove of the at least two second grooves has a length, measured along its extension, equal to or smaller than 30% of the width of the tread band.

17. The motorcycle tyre according to claim 12, wherein the at least two second grooves are substantially aligned to a continuation of the at least two first grooves that points towards the tyre shoulder.

18. The motorcycle tyre according to claim 1, wherein each first groove of the at least two first grooves has a depth equal to or smaller than 7 mm.

19. The motorcycle tyre according to claim 1, wherein each first groove of the at least two first grooves has, on at least one side of the tread band, a width that increases moving away from the equatorial plane.

20. The motorcycle tyre according to claim 1, wherein at least a portion of said second segment of said at least two first grooves has a second segment inclination angle relative to the equatorial plane that increases moving away from the equatorial plane.

21. The motorcycle tyre according to claim 1, wherein the void-to-rubber ratio is greater than or equal to 11%.

22. The motorcycle tyre according to claim 14, wherein the second inclination angles are greater than 20°.

23. The motorcycle tyre according to claim 1, wherein each first groove of the at least two first grooves has a depth equal to or smaller than 6 mm.

* * * * *

UNITED STATES PATENT AND TRADEMARK OFFICE
CERTIFICATE OF CORRECTION

| | | |
|---|---|---|
| PATENT NO. | : 11,040,574 B2 | Page 1 of 1 |
| APPLICATION NO. | : 15/767998 | |
| DATED | : June 22, 2021 | |
| INVENTOR(S) | : Misani et al. | |

It is certified that error appears in the above-identified patent and that said Letters Patent is hereby corrected as shown below:

On the Title Page

Item (54), the title "TYRE FOR MOTORCYLE WHEELS" should read --TYRE FOR MOTORCYCLE WHEELS--

In the Specification

Column 1, Line 1, the title "TYRE FOR MOTORCYLE WHEELS" should read --TYRE FOR MOTORCYCLE WHEELS--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*